US012485769B2

(12) United States Patent
Schroeder

(10) Patent No.: US 12,485,769 B2
(45) Date of Patent: Dec. 2, 2025

(54) NOISE REDUCTION IN A TRANSMISSION OF AN ELECTRIC VEHICLE DRIVE

(71) Applicant: Bayerische Motoren Werke Aktiengesellschaft, Munich (DE)

(72) Inventor: Norbert Schroeder, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 43 days.

(21) Appl. No.: 18/280,288

(22) PCT Filed: Apr. 8, 2022

(86) PCT No.: PCT/EP2022/059394
§ 371 (c)(1),
(2) Date: Sep. 5, 2023

(87) PCT Pub. No.: WO2022/233535
PCT Pub. Date: Nov. 10, 2022

(65) Prior Publication Data
US 2024/0149701 A1    May 9, 2024

(30) Foreign Application Priority Data
May 7, 2021  (DE) .................... 10 2021 111 908.1

(51) Int. Cl.
B60L 15/20    (2006.01)
(52) U.S. Cl.
CPC ......... *B60L 15/20* (2013.01); *B60L 2240/423* (2013.01); *B60L 2240/486* (2013.01); *B60L 2240/80* (2013.01); *B60L 2270/142* (2013.01)

(58) Field of Classification Search
CPC ............... B60L 15/20; B60L 2240/423; B60L 2240/486; B60L 2240/80; B60L 2240/48;
(Continued)

(56) References Cited

U.S. PATENT DOCUMENTS

| 2002/0049120 A1 | 4/2002 | Lindstorm et al. |
| 2019/0160964 A1 | 5/2019 | Ruiters et al. |

(Continued)

FOREIGN PATENT DOCUMENTS

| DE | 198 39 315 A1 | 3/2000 |
| DE | 101 19 724 A1 | 2/2003 |

(Continued)

OTHER PUBLICATIONS

Korean-language Office Action issued in Korean Application No. 10-2023-7028583 dated Jan. 31, 2025 with English translation (14 pages0.

(Continued)

*Primary Examiner* — Michael J Zanelli
(74) *Attorney, Agent, or Firm* — Crowell & Moring LLP

(57) ABSTRACT

A method and a device for controlling an electric driving machine of a motor vehicle are provided. A rotor shaft of the electric driving machine is connected to an output shaft of the motor vehicle via a geared transmission. During a load alteration of the driving machine, a shock torque load is applied by the driving machine prior to a changeover from one flank to another in the geared transmission in order to adjust the rotation of the gears of the geared transmission.

9 Claims, 4 Drawing Sheets

(58) Field of Classification Search
CPC ... B60L 2270/142; B60Y 2200/91; Y02T 10/64
See application file for complete search history.

(56) References Cited

U.S. PATENT DOCUMENTS

| | | |
|---|---|---|
| 2019/0263275 A1 | 8/2019 | Baba et al. |
| 2021/0031635 A1 | 2/2021 | Oide et al. |
| 2023/0223879 A1* | 7/2023 | Gaenzle ............... H02P 6/10 318/400.02 |

FOREIGN PATENT DOCUMENTS

| | | |
|---|---|---|
| DE | 601 04 247 T2 | 7/2005 |
| DE | 10 2008 009 201 A1 | 8/2009 |
| DE | 10 2010 031 815 A1 | 1/2012 |
| DE | 10 2015 118 507 B4 | 5/2018 |
| EP | 3 050 743 A1 | 8/2016 |
| EP | 3 632 733 A1 | 4/2020 |
| WO | WO 00/12885 A1 | 3/2000 |
| WO | WO 2015/146445 A1 | 10/2015 |

OTHER PUBLICATIONS

International Search Report (PCT/ISA/210) issued in PCT Application No. PCT/EP2022/059394 dated Aug. 4, 2022 with English translation (5 pages).

German-language Written Opinion (PCT/ISA/237) issued in PCT Application No. PCT/EP2022/059394 dated Aug. 4, 2022 with English translation (8 pages).

German Office Action issued in German-language Application No. 10 2021 111 908.1 dated Nov. 3, 2021 (5 pages).

* cited by examiner

NOISE REDUCTION IN A TRANSMISSION OF AN ELECTRIC VEHICLE DRIVE

BACKGROUND AND SUMMARY OF THE INVENTION

The present subject matter relates to controlling an electric drive machine of a motor vehicle, the rotor shaft of which is connected via a gearwheel mechanism to an output shaft of the motor vehicle.

For gearwheel mechanisms which are coupled directly (often as a step-down gear stage) to the electric drive machine, a clicking noise often occurs during the load change. During maneuvering operation or during the traction/overrun change, for example, these disruptive structure-borne sound pulses occur during the torque zero crossing of the drive machine.

An attempt is made to reduce these pulses by way of torque interventions, as far as possible without influencing the drivability, in the best case without being perceived by the vehicle occupants. These torque interventions are introduced at the time of the flank change and immediately before this, and are parameterized in such a way that they decrease the torque gradient.

This has only a small influence, however, on the cause (e.g., the excitation) of the noise, especially since the application time of the intervention is strictly limited if perception of the intervention by way of the driver is to be avoided. These methods therefore require additionally solid secondary measures on the underbody sealing, by way of foam parts or further encapsulation measures.

Against this background, it is an object of the present subject matter to improve control of an electric drive machine of a motor vehicle, the rotor shaft of which is connected via a gearwheel mechanism to an output shaft of the motor vehicle.

By way of its features, each of the independent claims defines a subject matter which achieves this object. The dependent claims relate to advantageous developments of the present subject matter.

In accordance with one aspect, a method for controlling an electric drive machine of a motor vehicle is disclosed, the rotor shaft or a motor output shaft, connected for torque transmission, of the drive machine is connected via a gearwheel mechanism to an output shaft of the motor vehicle. The rotor shaft or the motor output shaft is normally loaded with a variable motor output torque which has an accelerating or braking effect on a change in the rotational movement or, in idling operation, has no effect. The output shaft is normally connected directly or indirectly to the drive wheels of the motor vehicle, and is therefore loaded with a variable driving torque from the driving operation.

In the case of a load change of the drive machine, a torque spike of the drive machine for the adaptation (in particular, retardation or acceleration) of the (in particular, common) rotational movement of the gearwheels of the gearwheel mechanism is provided temporally before a flank change of the gearwheel mechanism. In example, the torque spike is actuated and/or completed before the flank change.

In the present case, the torque spike is to be understood, as proceeding from an output torque profile over time provided per se, before, during and after the load change.

The torque spike (e.g., a torque intervention in the sense of a deviation from the torque profile, provided per se with respect to the load change, of the drive machine) is selected in such a way that the circumferential speed of the two gearwheels which mesh with one another is adapted and/or a relative circumferential speed of the two gearwheels which mesh with one another is reduced.

Which adaptation of the rotational speed is performed is dependent, in particular, on the type of load change: a retarding torque spike is provided in the case of a load change toward the overrun flank, and an accelerating torque spike is provided in the case of a load change toward the traction flank.

This can achieve a situation where the flanks, which meet one another after the flank change on account of the backlash of the toothing system, of the two gearwheels collide at a relatively low relative speed. Despite the relative speed, added during the flank change, of the flanks which come into contact with one another on account of the backlash, the impact in the case of the contact is lower on account of the absolute circumferential speed which is then lower/higher, and a noise which is produced as a result is quieter. A poor perceived quality of the transmission on account of a loud noise (frequently perceived as "clicking") can be avoided as a result.

In the present case, a load change is to be understood to mean, strictly speaking, a zero crossing of the output torque of the drive machine which occurs, in particular, from the driving operation, for example in the case of a change between a forward and a reverse gear or vice versa, or in the case of a change from accelerating toward braking or vice versa. In the broader sense, however, the entire process from the detection of a load change request or a load change situation as far as the concluded flank change is also meant here. Viewed in the abstract, there are two types of a load change in the present sense: a load change toward the traction flank, and a load change toward the overrun flank.

In the present case, a flank change of two gearwheels which mesh with one another is to be understood to mean, in particular, a transition of a bearing contact between the gearwheels from one flank of an initially meshing tooth to the flank of the subsequently meshing tooth of one of the gearwheels. This flank change is as a rule afflicted by backlash, with the result that an audible impact can occur in the case of a torque change on one of the gearwheel shafts, even with an involute toothing system, during the formation of the new flank contact, which audible impact arises at different prevailing torques from an additional relative speed when passing through the backlash. An impact of this type is perceptible, in particular, at comparatively low rotational speeds (of the drive and therefore of the shafts and the gearwheel s).

In the present case, a common rotational movement of two gearwheels which are in engagement is to be understood to mean, in particular, that rotational movement which the two gearwheels run through in a manner which is dependent on one another, i.e., bearing against one another, if no flank change is currently taking place. During a dependent movement of this type, the torque spike can adapt to the rotational movement of the two gearwheels (and therefore also of the shafts), without necessitating a relative movement of the two gearwheels with respect to one another.

In accordance with a further aspect, an apparatus for controlling an electric drive machine of a motor vehicle is disclosed, the rotor shaft of which is connected via a gearwheel mechanism to an output shaft of the motor vehicle, and is configured to carry out a method in accordance with one example of the present subject matter.

The present subject matter is based, inter alia, on the concept of introducing, before the flank change, a torque profile which can be, in particular, shaped in the sense of a torque spike for braking or accelerating the rotor of the electric drive machine into the torque profile as a deviation. This can be applied, in particular, in terms of its magnitude, its duration and/or its temporal interval with respect to (ahead of) the flank change, and can be triggered, for example, by way of a torque threshold value and/or gradient. The torque spike reduces the impact velocity of the transmission shafts during the flank change as a consequence of a load change. The decreased impact velocity ensures a considerably smaller structure-borne sound pulse and therefore a lower disruptive noise.

In accordance with one example, in consideration with the immediately previously and subsequently adjacent output torque profile of the drive machine, the torque spike has a torque gradient profile with at least two sign changes, between a spike begin and a spike end.

In this way, in a short time which is not perceptible in the optimum case for the driver or other occupants or bystanders, a comparatively pronounced intervention into the output torque profile of the drive machine is possible.

In accordance with one example, a retarding torque spike is applied in the case of a load change toward the overrun flank, and/or an accelerating torque spike is applied in the case of a load change toward the traction flank.

As a result, a noise reduction can be achieved in both possible load change types.

In accordance with one example, the torque spike is concluded before the start of the flank change, before the rolling contact on the "old" flank has ended and therefore before entry into a backlash phase, in which the movement of the two gearwheels is not dependent on one another.

As a result, the effect of the torque spike can be predicted exactly because the intervention does not take place in the backlash phase; metering of the required torque spike is possible.

In accordance with one example, the torque spike is defined by way of a spike magnitude, i.e., a deviation of the spike torque from a regular load change torque for the present operating case. The spike magnitude, e.g., the amplitude of the spike, is between 3 and 15 Nm, between 5 and 10 Nm.

Torque spikes of this spike magnitude are typically not perceived during driving operation as an undesired deviation from the desired driving behavior of the motor vehicle.

According to one example, the torque spike is determined by way of a spike duration, e.g., a time duration from the first to the last deviation of the spike torque from a regular load change torque for the present operating case. In particular, the spike duration is at most 50 milliseconds, at most 40 or 30 or 20 milliseconds.

Torque spikes with at most a duration of this type are typically perceived during driving operation as an undesired deviation from the desired driving behavior of the motor vehicle.

In accordance with one example, the torque spike is determined by way of a spike interval from the flank change, from the zero crossing of the load change, i.e., a time duration from the first to the last deviation of the spike torque from a regular load change torque for the present operating case.

Dynamic effects of the spike, for example in the form of reverberation, can be taken into consideration by way of the determination of the interval of the spike in such a way that an optimum effect of the spike occurs at the time of the flank change.

In accordance with one example, a spike profile is predefined, with regard to spike magnitude and spike duration between the spike beginning and the spike end, by way of a deviation function, a sine, a cosine or a polynomial function, and/or the/a deviation function for the spike duration between the spike beginning and the spike end replaces or superimposes the torque specification for the output torque profile, provided per se for the load change, of the drive machine.

The deviation of the spike torque from the standard output torque profile of the drive machine integrated over the spike duration is representative of the braking effect on the transmission shafts and therefore the gearwheels which are in engagement. In particular, a desired braking effect can be set via the interaction of spike magnitude and spike duration.

In accordance with one example, the present subject matter can be applied to the overrun flank and also to the traction flank of the gearwheel mechanism.

DETAILED DESCRIPTION

Figure 4:
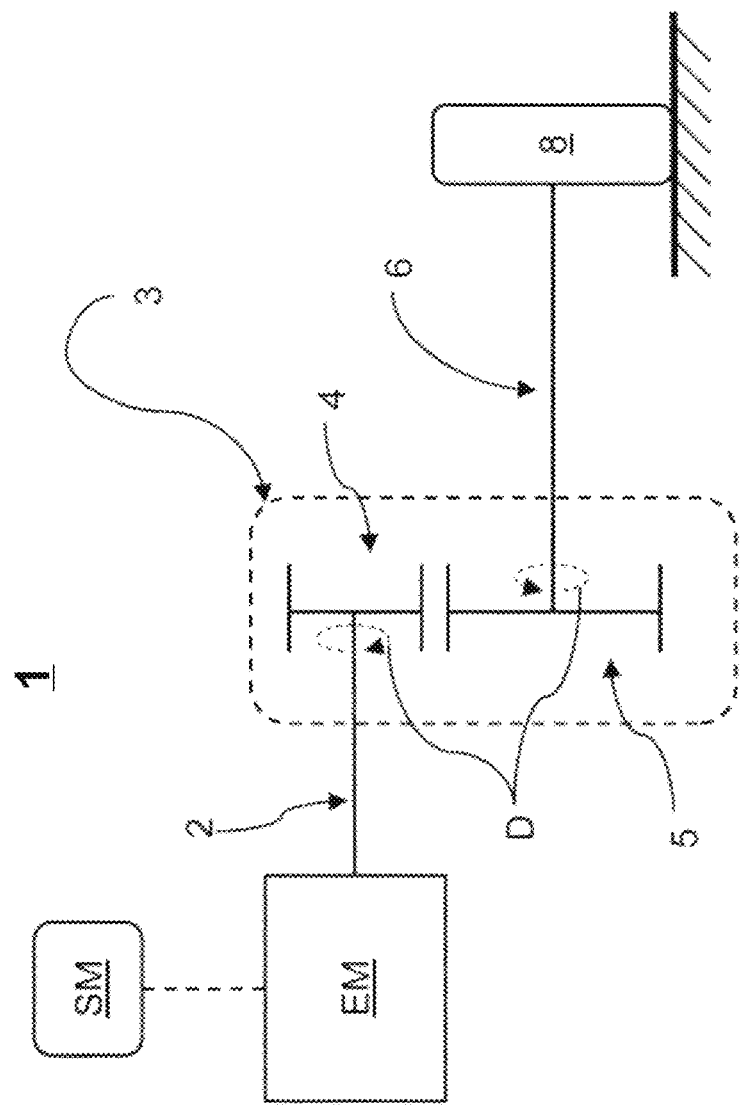
FIG. 4 shows, in greatly simplified form, the vehicle drive, by way of which the exemplary method described in respect of FIGS. 2 and 3 is performed.

FIG. 4 shows an electric vehicle drive 1 with an electric drive machine EM of a motor vehicle, the rotor shaft 2 of which is connected via a gearwheel mechanism 3 to an output shaft 6 of the motor vehicle and two wheels 8 which rotate indirectly on the latter.

The gearwheel mechanism 3 has a step-down gearwheel stage with gearwheels 4 and 5 which are in engagement with one another and therefore, apart from a backlash (not shown) of the toothing system, can carry out a common rotational movement D in a manner which is dependent on one another, in accordance with the specification of the drive machine EM.

The specification of the rotational movement D (also in accordance with the example of FIGS. 2 and 3) takes place by way of a control apparatus SM of the electric drive machine EM. A prior art method as described in respect of FIG. 1 can also be carried out by way of the hardware components of the vehicle drive 1.

Figure 1:
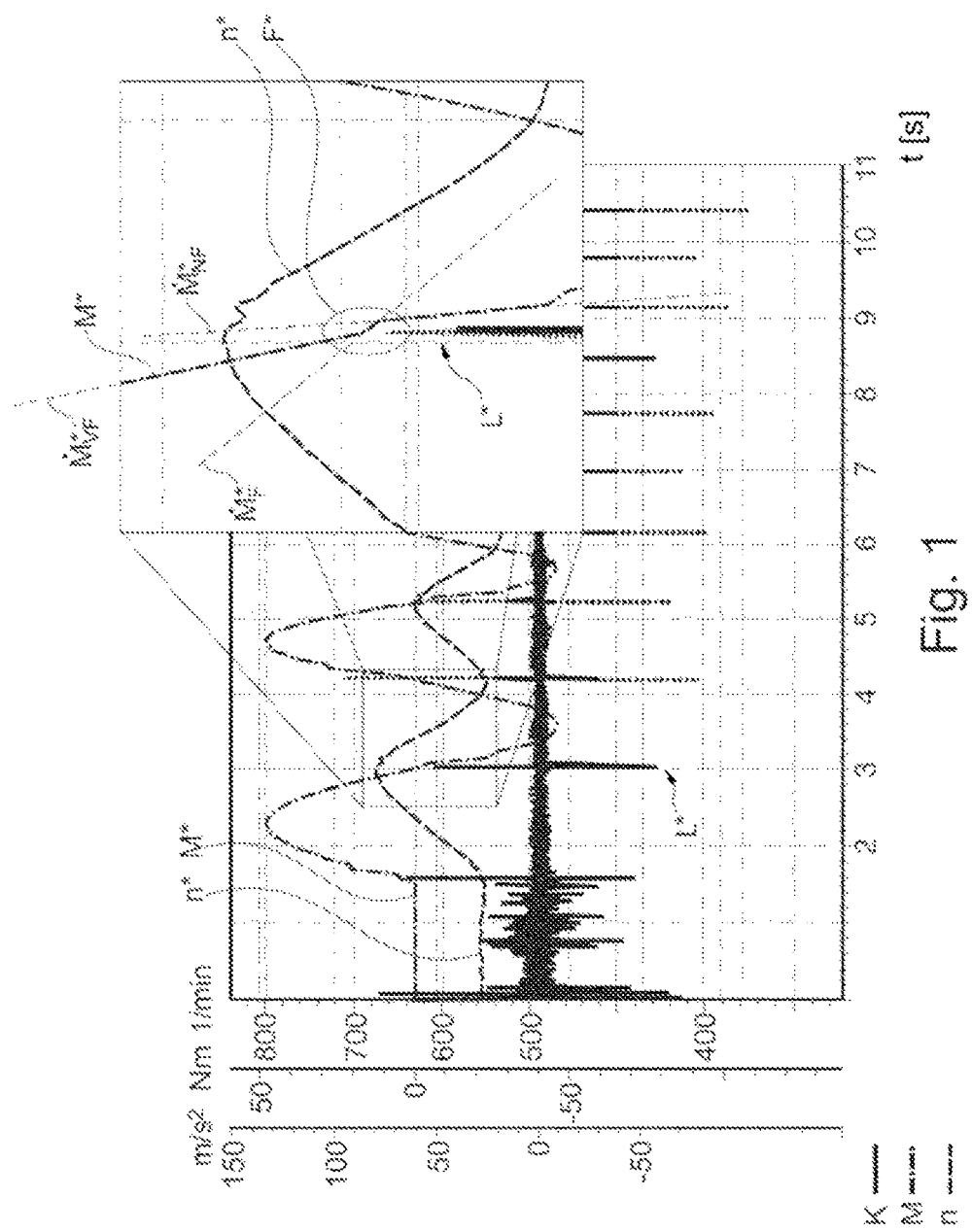
FIG. 1 illustrates a torque intervention in accordance with a prior art method for noise reduction during a load change.

FIG. 1 uses a diagram to show a prior art method for controlling an electric vehicle drive with the hardware from FIG. 4, in the case of a load change of the drive machine.

It is to be gathered from the torque development M* of the motor output torque that, in the region of a flank change F*, a torque gradient $\dot{M}_F^*$ with a lower absolute value is developed than before ($\dot{M}_{VF}^*$) and subsequently ($\dot{M}_{NF}^*$).

The development of the (output) rotational speed n of the electric drive machine takes place correspondingly.

In addition, the structure-borne sound acceleration K is also plotted in the diagram. This specification serves here as an indicator for a disruptive noise: the higher the structure-borne sound acceleration K, the louder the disruptive noise to be expected.

It can be gathered from the diagram that, in the case of this known solution, a high peak of the structure-borne sound acceleration K and therefore an undesired noise occurs in the transmission each time at the zero crossing of the motor output torque M*—despite the known countermeasure of lowering the absolute value of the torque gradient $\dot{M}_F{}^*$ during the flank change. In addition, complicated and expensive noise damping is additionally required in the case of this known method.

Figure 2:
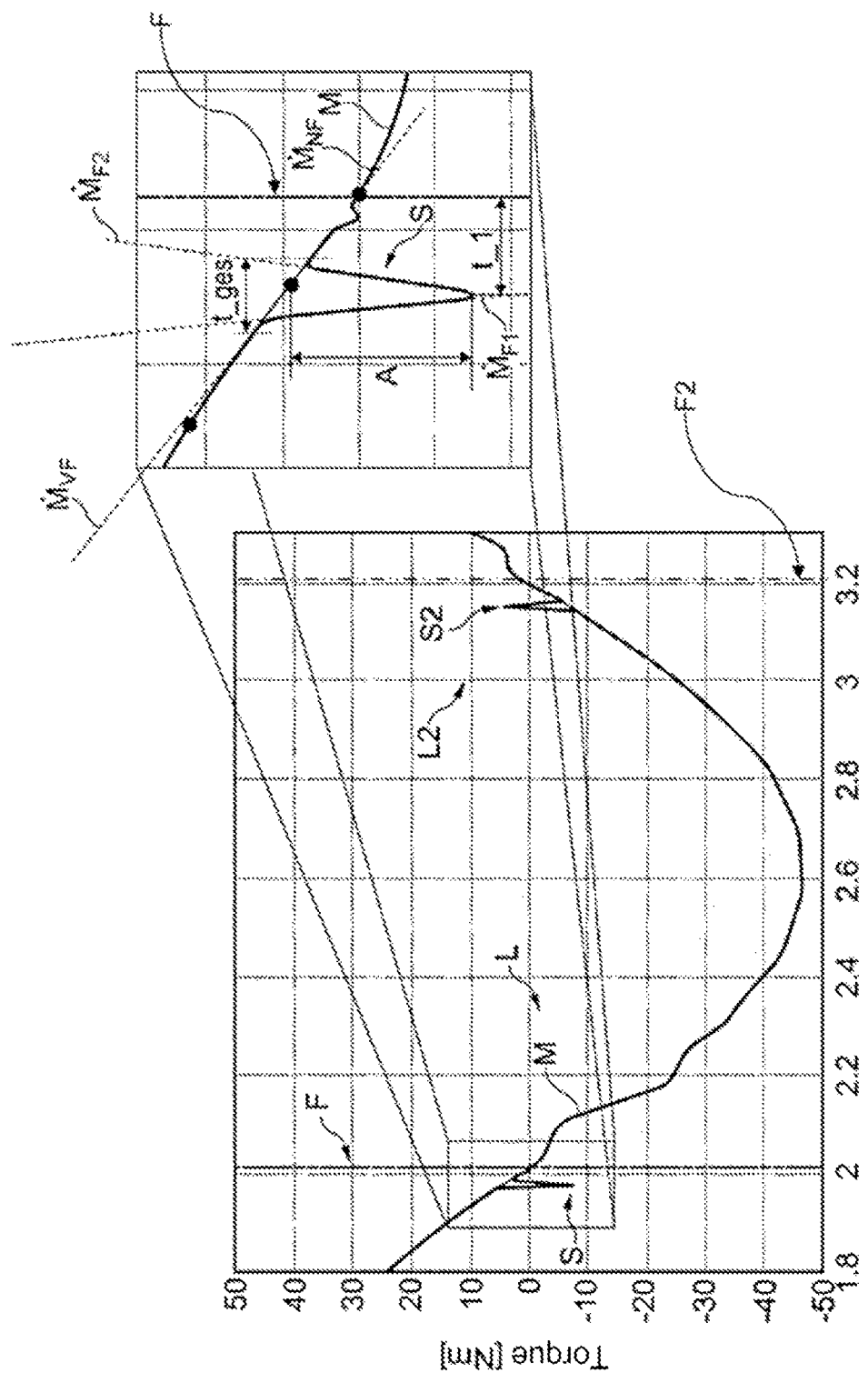
FIG. 2 illustrates a torque spike in accordance with one example of the present subject matter.
Figure 3:
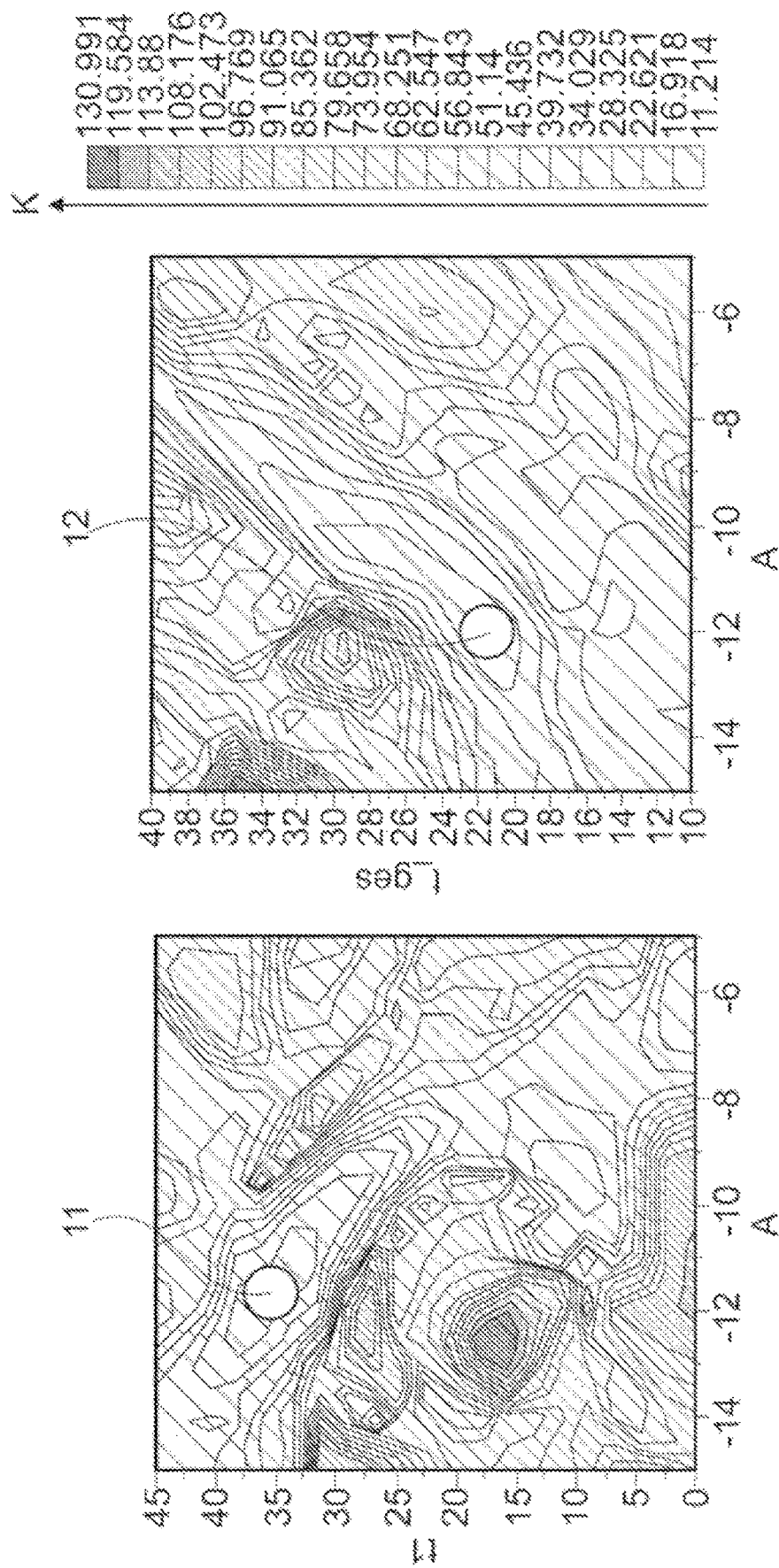
FIG. 3 illustrates a determination of parameters of the torque spike from FIG. 2.

In FIGS. 2 and 3, in contrast, a method for controlling the electric drive machine EM in the vehicle drive 1 from FIG. 4 is described:

In the case of a load change L of the drive machine EM, a torque spike S of the drive machine for the adaptation of the common rotational movement D of the gearwheels 4, 5 is actuated before a flank change F of the gearwheel mechanism 3.

In this way, those flanks of the two gearwheels 4, 5 which come into contact with one another after the flank change on account of the backlash of the toothing system collide at a lower relative speed. A poor perceived quality of the transmission on account of a loud noise can be avoided as a result.

In the example, the torque spike S has a torque gradient profile $\dot{M}_{VF}$, $\dot{M}_{F1}$, $\dot{M}_{F2}$, $\dot{M}_{NF}$ with at least two sign changes, here from $\dot{M}_{F1}$ to $\dot{M}_{F2}$ and from $\dot{M}_{F2}$ to $\dot{M}_{NF}$. In this way, a comparatively great intervention in the output torque gradient M of the drive machine EM is possible in a short, imperceptible time t_ges.

A retarding torque spike S is applied in the case of a load change L toward the overrun flank, and an accelerating torque spike S2 is applied in the case of a load change L2 toward the traction flank. As a result, a noise reduction can be achieved in both possible load change types.

In the example, the torque spike S is concluded before a start of the flank change F. As a result, the effect of the torque spike S can be predicted exactly because the intervention does not take place in the backlash phase; metering of the required torque spike S is possible.

Here, the torque spike S is determined by way of its spike magnitude A, i.e., a deviation of the spike torque from a regular load change torque M with respect to the flank change for the present operating case, at a time t_Amax=t_F−t_1. The spike magnitude A is approximately 10 Nm here, which is typically not perceived as influencing the driving behavior in driving operation.

Furthermore, the torque spike S is determined by way of its spike duration t_ges. The spike duration t_ges is at most 40 milliseconds in the example, in order to not be perceived in the relevant driving situations, not during maneuvering or parking.

Furthermore, the torque spike s is determined by way of a spike interval t_1 from the flank change F. As a result, dynamic effects of the spike, for example in the form of reverberation, can be taken into consideration in such a way that an optimum effect of the spike occurs at the time of the flank change.

In the case of the vehicle drive 1 of the example, tables which make a determination of the torque spike S to be actuated for the operating states to be expected of the vehicle and/or the drive 1 are stored in a memory of the control apparatus SM. The tables are populated with data from tests and/or simulation runs, and contain values to be used for the spike magnitude A, the spike duration t_ges and the spike interval t_1 for each provided operating state.

FIG. 3 shows the result of the tests/simulations for populating the tables with data for an exemplary operating state in two diagrams (spike magnitude plotted against spike interval and spike duration): in each of the diagrams, a data point 11, 12 for determining the torque spike is plotted for illustrative purposes, at which data point 11, 12 the remaining structure-borne sound acceleration K and therefore the disruptive noise to be expected are at a minimum.

From the combination of the two depicted data points 11, 12, the table can be filled in such a way that, for the operating state which is shown, the torque spike is determined on the basis of the parameters spike magnitude A, spike duration t_ges and spike interval t_1, and can be actuated during operation in the case of a load change occurring in the operating state which is shown.

LIST OF DESIGNATIONS

1 Electric vehicle drive
2 Rotor shaft
3 Gearwheel mechanism
4,5 Gearwheels
6 Output shaft
A Spike strength
D Rotational movement
EM Electric drive machine
F Flank change
K Structure-borne sound
L Load change
M Development of the motor output torque
Torque gradient
n Development of the rotational speed
S,S2 Torque spike
SM Control apparatus (e.g., electronic control unit)
t_ges Spike duration
t_1 Spike interval from the flank change

The invention claimed is:

1. A method for controlling an electric drive machine of a motor vehicle, wherein a rotor shaft of which is connected by a gearwheel mechanism comprising a plurality of gearwheels to an output shaft of the motor vehicle, the method comprising:
during a load change of the drive machine before a flank change of the gearwheel mechanism, providing a torque spike of the drive machine to adapt rotational movement of the gearwheels of the gearwheel mechanism, and
concluding the torque spike before a start of the flank change.

2. The method according to claim 1, wherein
the torque spike has a torque gradient profile with at least two sign changes.

3. The method according to claim 1, further comprising:
during a load change toward an overrun flank, applying a retarding torque spike, and/or
during a load change toward a traction flank, applying an accelerating torque spike.

4. The method according to claim 1, wherein
the torque spike is determined by way of a spike magnitude.

5. The method according to claim 1, wherein
the torque spike is determined by way of a spike duration.

6. A method for controlling an electric drive machine of a motor vehicle, wherein a rotor shaft of which is connected by a gearwheel mechanism comprising a plurality of gearwheels to an output shaft of the motor vehicle, the method comprising:
during a load change of the drive machine before a flank change of the gearwheel mechanism, providing a torque spike of the drive machine to adapt rotational movement of the gearwheels of the gearwheel mechanism, wherein the torque spike is determined by way of a spike duration, and wherein the spike duration is at most 50 milliseconds.

7. The method according to claim 6, wherein the spike duration is at most 20 milliseconds.

8. A method for controlling an electric drive machine of a motor vehicle, wherein a rotor shaft of which is connected by a gearwheel mechanism comprising a plurality of gearwheels to an output shaft of the motor vehicle, the method comprising:

during a load change of the drive machine before a flank change of the gearwheel mechanism, providing a torque spike of the drive machine to adapt rotational movement of the gearwheels of the gearwheel mechanism, wherein the torque spike is determined using a spike interval from the flank change.

9. A method for controlling an electric drive machine of a motor vehicle, wherein a rotor shaft of which is connected by a gearwheel mechanism comprising a plurality of gearwheels to an output shaft of the motor vehicle, the method comprising:

during a load change of the drive machine before a flank change of the gearwheel mechanism, providing a torque spike of the drive machine to adapt rotational movement of the gearwheels of the gearwheel mechanism, wherein:

a spike profile is predefined by way of a deviation function, and/or the deviation function for a spike duration replaces or superimposes an output torque profile provided for the load change of the drive machine.

* * * * *